United States Patent
Hosabettu et al.

(10) Patent No.: US 9,223,959 B2
(45) Date of Patent: Dec. 29, 2015

(54) SYSTEMS AND METHODS FOR AUTHENTICATION BASED ON USER PREFERENCES

(71) Applicants: Raghavendra Hosabettu, Bangalore (IN); Raja Sekhar Reddy Sudidhala, Bangalore (IN); Nita Aknurwar, Bangalore (IN)

(72) Inventors: Raghavendra Hosabettu, Bangalore (IN); Raja Sekhar Reddy Sudidhala, Bangalore (IN); Nita Aknurwar, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 89 days.

(21) Appl. No.: 14/137,906

(22) Filed: Dec. 20, 2013

(65) Prior Publication Data

US 2015/0135289 A1  May 14, 2015

(30) Foreign Application Priority Data

Nov. 8, 2013 (IN) .......................... 5052/CHE/2013

(51) Int. Cl.
  *G06F 7/04* (2006.01)
  *G06F 21/46* (2013.01)
  *G06F 21/36* (2013.01)

(52) U.S. Cl.
  CPC .............. *G06F 21/46* (2013.01); *G06F 21/36* (2013.01); *G06F 2221/2149* (2013.01)

(58) Field of Classification Search
  CPC .......................... G06F 21/46; G06F 2221/2149
  USPC ............................................................. 726/6
  See application file for complete search history.

(56) References Cited

U.S. PATENT DOCUMENTS

| 6,421,453 B1 | 7/2002 | Kanevsky et al. |
| 2004/0230843 A1* | 11/2004 | Jansen .......................... 713/202 |
| 2008/0184360 A1* | 7/2008 | Kornilovsky et al. ........... 726/17 |
| 2010/0169958 A1 | 7/2010 | Werner et al. |
| 2013/0097697 A1* | 4/2013 | Zhu et al. ........................ 726/18 |

FOREIGN PATENT DOCUMENTS

WO    WO 02/33882    4/2002

OTHER PUBLICATIONS

Takada, et al., "Awase-E: Image-based Authentication for Mobile Phones using User's Favorite Images," Proceedings of the 5th Int'l Symposium on Human Computer Interaction with Mobile Devices and Services (Mobile HCI 03), pp. 347-351, Sep. 2003.

* cited by examiner

*Primary Examiner* — Mohammad W Reza
(74) *Attorney, Agent, or Firm* — Finnegan, Henderson, Farabow, Garrett & Dunner, L.L.P.

(57) ABSTRACT

This disclosure relates generally to authentication for an electronic device, and more particularly to systems and method for authentication based on user preferences. In one embodiment, an authentication method is disclosed, comprising: receiving, at the electronic device, a first input; determining a password theme based on the first input and user preferences associated with the password theme; displaying the password theme, the displayed password theme comprising a plurality of visual cues; receiving, at the electronic device, a second input comprising a sequence of visual cues selected from the visual cues; verifying the sequence of visual cues; and providing access to the electronic device based on the verification.

17 Claims, 5 Drawing Sheets

SYSTEMS AND METHODS FOR AUTHENTICATION BASED ON USER PREFERENCES

PRIORITY CLAIM

This U.S. patent application claims priority under 35 U.S.C. §119 to Indian Patent Application No. 5052/CHE/2013, filed Nov. 8, 2013. The aforementioned application is incorporated herein by reference in its entirety.

TECHNICAL FIELD

This disclosure relates generally to authentication, and more particularly to systems and methods for authentication based on user preferences.

BACKGROUND

As a huge amount of information is being digitized, authentication of such information is extremely important for security purposes. Therefore, techniques like password recognition and pattern recognition find a vital place in securing digital information on electronic devices. For more security, however, it is preferable to have a complex password or pattern, which may sometimes be cumbersome for a user. Another technique that may be used for authenticating a user is biometric identification in which an electronic device may identify a fingerprint, face, or other features of the user's body. Further, in another technique known as image based authentication, a set of images is displayed by the electronic device every time a user requests authentication. In order to be authenticated, the user selects one or more of the displayed images. Once authenticated, the user gains access to the electronic device.

SUMMARY

In one embodiment, an authentication method for an electronic device is disclosed, comprising: receiving, at the electronic device, a first input; determining a password theme based on the first input and user preferences associated with the password theme; displaying the password theme, the displayed theme comprising a plurality of visual cues; receiving, at the electronic device, a second input comprising a sequence of visual cues selected from the visual cues; verifying the sequence of visual cues; and providing access to the electronic device based on the verification.

In one embodiment, an electronic device is disclosed, comprising: one or more processors; and a memory storing instructions executable by the one or more processors, wherein the instructions configure the one or more processors to: receive a first input; determine a password theme based on the first input and user preferences associated with the password theme; display the password theme, the displayed theme comprising a plurality of visual cues; receive a second input comprising a sequence of visual cues selected from the visual cues; verify the sequence of visual cues; and provide access to the electronic device based on the verification.

In one embodiment, a non-transitory computer-readable medium is disclosed, the non-transitory computer-readable medium storing instructions that, when executed by one or more processors, causes the processor to perform operations comprising: receiving, at an electronic device, a first input from a user; determining a password theme based on the first input and user preferences associated with the password theme; displaying the password theme, the displayed theme comprising a plurality of visual cues; receiving, at the electronic device, a second input comprising a sequence of visual cues selected from the plurality of visual cues; verifying the sequence of visual cues; and providing access to the electronic device based on the verification.

It is to be understood that both the foregoing general description and the following detailed description are exemplary and explanatory only and are not restrictive of the claimed subject matter.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
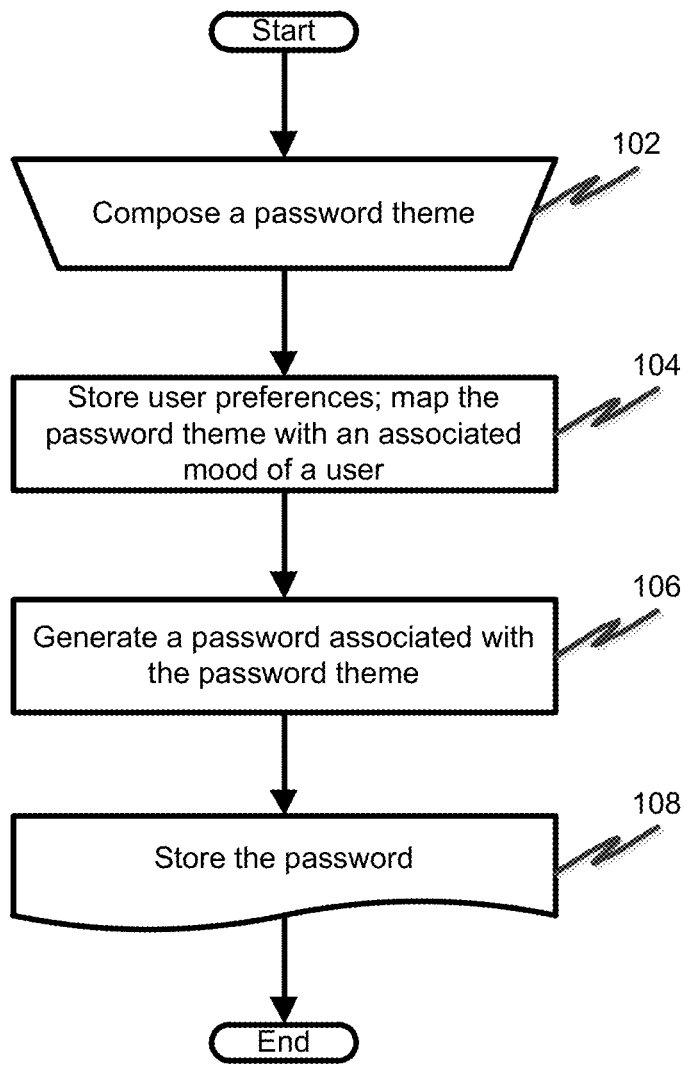
FIG. 1 illustrates a flowchart for configuring password themes in accordance with some embodiments.

FIG. 1 illustrates a flowchart for configuring one or more password themes. In step 102, one or more password themes may be composed by a processor of an electronic device.

A password theme may represent a set of real life activities or items in the form of visual cues such as images, symbols, and characters. It should be apparent, however, to a person skilled in the art that a password theme is not limited to representing real life activities or items and may represent any group of visual cues that share one or more common characteristics. Some non-limiting examples of password themes may include music, movies, food items, shopping activities, routine activities, languages, festivals etc. In one example, password theme "music" may represent multiple visual cues related to music. In keeping with this example, 4 visual cues associated with the password theme "music" may include images representing 4 different songs. Further, it should be apparent to a person skilled in the art that the visual cues are not necessarily limited to representing songs and may also represent singers, music bands, genres of music etc. In addition, one or more of the visual cues associated with the password theme may be represented in the form of icons, images, or symbols.

In some embodiments, the visual cues associated with a password theme may further be grouped into various categories that are associated with the password theme. A category may include a group of visual cues associated with the password theme that share one or more common characteristics. In one example, the theme "music" may include fifty-four visual cues that are associated with one or another form of music. These fifty-four cues may be grouped into six categories representing six different genres of music—classical music, country music, pop music, electronic music, metal music, and blues music. Here, a category such as "classical music" may further include nine visual cues representing nine types of classical music—symphony, opera, choral works, chamber music, gregorian chant, madrigal, dhrupad, dhamar, and khayal. In this example, symphony, opera, dhamar, and khayal may be represented by their respective icons indicating their names. Further, choral works, chamber music, Gregorian chant, madrigal, and dhrupad may be represented by symbols associated with each of them.

In another example, a password theme "food" may be divided into four categories—fruits, seafood, egg products, and Italian food. A category such as "fruits" may further be divided into six visual cues representing types of fruits—bananas, grapes, guavas, mangoes, apples, and strawberries. Here, bananas and grapes may be represented by their respective images. Further, guavas, mangoes, apples, and strawberries may be represented by logos representing their respective names. Similarly, all the other categories may be divided into various types that may be represented by visual cues.

Referring back to step 102, a password theme may be composed in response to an input from a user. In some embodiments, composing password themes may include selecting one or more password themes from a set of password themes that are already stored in a memory of the electronic device. The set of password themes including their associated visual cues and categories may have been stored in the electronic device by a manufacturer at the time of manufacture. In one example, a list of names of such password themes may be displayed by the electronic device and the user may select a password theme from the list. Once the password theme is selected, all the categories associated with the selected password theme and all the visual cues associated with each category may be automatically included in the password theme. Alternately, on selecting a password theme, the user may manually select some categories instead of selecting all the categories or define new categories by adding visual cues to them as per the requirement of the user. Similarly, the user may also manually select some visual cues from a category instead of all the visual cues and include them in the selected password theme.

In some embodiments, the composition of the password themes may include creating new password themes. In one example, a user may create a password theme by manually inputting a name of the theme. The created password theme may further be configured by defining various categories and associating visual cues with each of the defined categories. The visual cues may be selected from a memory of the electronic device, imported from internet or another electronic device or captured from a camera of the electronic device. A user may create multiple password themes in a similar manner.

Once the password themes are configured, user preferences may be set and stored in the electronic device in step 104. In some embodiments, a user may define user preferences by associating a password theme with a mood of the user. The mood may represent a state of mind or a behavioral characteristic of the user. For example, a "happy" mood may represent that the user is in a cheerful mood. Similarly, an "angry" mood may represent the user is angry and a "depressed" mood represents the user is in a sad or depressed mood. The user preferences may be used to create a mapping table such as table 1 that represents a mapping between various moods and the configured password themes:

TABLE 1

| Mapping between themes and states of mind | | | |
|---|---|---|---|
| List of Themes | Happy | Depressed | Angry |
| Music | ☑ | ☐ | ☐ |
| Cars | ☐ | ☐ | ☐ |
| Movies | ☐ | ☑ | ☑ |
| Party activities | ☐ | ☐ | ☐ |
| Shopping activities | ☐ | ☐ | ☐ |
| Food | ☑ | ☑ | ☐ |
| Fun activities | ☐ | ☐ | ☐ |

It should be understood, however, that the represented moods are discussed only for exemplary purposes and are not limiting examples. Various password themes may be mapped to other moods such as irritated, afraid, and relaxed. It should further be apparent that more one password theme may also be associated to more than one mood. In an embodiment, where a password theme is associated with more than one mood, a different set of visual cues associated with the password theme may be associated with each mood. For example, if a password theme "movies" is associated with both "angry" and "depressed" moods, a first set of visual cues representing action movies may be associated with the "angry" mood and a second set of visual cues representing comedy, movies may be associated with the "depressed" mood.

On mapping the password themes to their associated moods, a password associated with each password theme may be generated, in step 106. A password associated with a password theme may include one or more visual cues that are included in that password theme. In some embodiments, the electronic device may randomly generate a password by selecting a combination of visual cues and notifying the user. In some embodiments, however, the user may manually select a combination of visual cues comprising, for example, some of the user's favorite visual cues, in a particular sequence to form a password. This password may be set as the default password for the password theme by associating it with the password theme. In one example, a user may select four visual cues associated with the theme "food" in a sequential order and set this sequence of visual cues as a password for the password theme "food." Here, the password may include visual cues—bananas, omelet, fried fish, and pasta in the mentioned sequence. Once the electronic device receives the selection of these visual cues from the user, the sequence of visual cues is stored as the default password for the password theme "food" in the memory of the electronic device. Passwords for other password themes may also be generated in a similar manner either automatically by the electronic device or randomly by the user.

Once the password associated with a password theme is generated, the password may be stored in the memory of the electronic device for future use in step 108.

Figure 2:
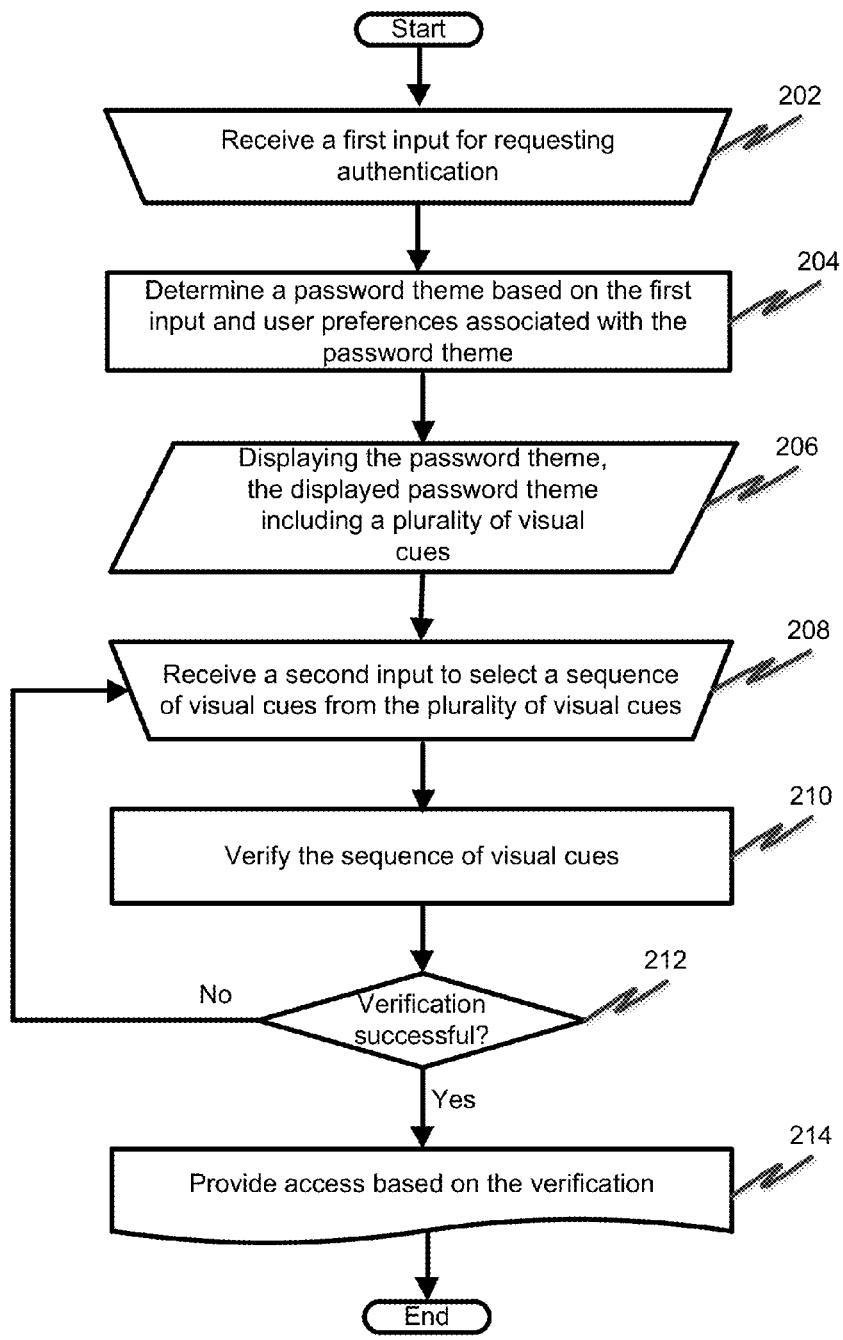
FIG. 2 illustrates a flowchart of an exemplary method of authentication in accordance with some embodiments.

FIG. 2 illustrates a flowchart of an exemplary method of authentication in accordance with some embodiments. In step 202, an electronic device may receive a first input for requesting authentication. In some embodiments, the first input may include a touch stroke from a user to attempt to unlock the electronic device. The stroke may include touching or swiping a touch screen or a touch pad of the electronic device. The swipe input may include a horizontal, vertical, or a diagonal drag on the touch screen. It should be apparent to a person skilled in the art, however, that the first input is not limited to the mentioned touch inputs and may include a single touch input at a point on the touch screen, multi-touch input at multiple points on the touch screen, swipe input in a predetermined direction around a 360° angle from a starting point, and swipe input in a continued sequence of directions such as a pattern.

In one example, a user may swipe horizontally in the right direction in an attempt to unlock the electronic device. In another example, a user may touch three points on the touch screen in a sequence in order to unlock the electronic device. In yet another example, a user may simply touch a highlighted point on the screen to attempt to unlock the electronic device.

In step 204, a processor of the electronic device may determine a password theme based on the first input and user preferences associated with the password theme.

Once the first input is received, the processor of the electronic device may determine a mood of the user based on the first input. For example, the processor may determine that the mood of the user is "happy" based on the first input. Similarly, the processor in certain other cases may determine that the mood of the user is "sad" or "depressed" based on the first input. In some embodiments, the mood of the user may be determined based on one or more touch-sensitive parameters associated with the first input. These touch-sensitive parameters may include angle of stroke associated with the first input. For example, the processor may determine that the angle of a user's finger or a stylus during a swipe input is 60° with the touch screen indicating that the user's finger was tilted while swiping. The touch-sensitive parameters may further include duration of contact of a stroke with the touch screen. For example, the processor may determine that a user's finger or a stylus contacts the touch screen for 560 milliseconds in case of a swipe input. The parameters may further include pressure applied on the touch screen by the stroke. For example, the pressure applied on the touch screen at single point may be determined in case of a single touch input while in case of a multi-touch input, the pressure applied at all points of contact may be determined. Similarly, in case of a swipe input, pressure may be determined at start and end points of the swipe or throughout the line of contact of the swipe.

In addition, the touch-sensitive parameters may include area covered by a user's finger or a stylus while providing the first input. For example, a broad fingertip of a user's finger may cover a broader area while touching the screen than a narrow fingertip of another user's finger. Further, the touch-sensitive parameters may include direction of stroke associated with the first touch input. In one example, the electronic device may determine that the swipe is in a horizontal direction and towards the left. Similarly, the electronic device may determine other directions such as vertical, diagonal, right, left etc. The touch-sensitive parameters may further include shape of a swipe movement associated with a touch input. For example, the electronic device may determine that the touch movement is linear, circular, curvilinear, or has any other geometrical shape. The touch-sensitive parameters may further include position coordinates of one or more points of contact associated with a stroke. The touch-sensitive parameters may further include a length of swipe. The length of swipe includes the distance between start and end points of the swipe.

Further, the touch-sensitive parameters may include a dryness level associated with a user's finger or a stylus that touches the touch screen of the electronic device. For example, at certain instances, the finger of a user may be dry while touching the touch screen. At certain other instances, the finger of the user may be relatively humid such as when the user is sweating or there is water on the finger. The touch-sensitive parameters may further include one or more of speed and acceleration associated with a stroke. For example, in case of a swipe input, the speed of the swipe may be calculated from the length of swipe and the duration of contact with the touch screen. The touch-sensitive parameters may also include irregularity of a stroke associated with the first touch input. In one example, the electronic device may determine that the swipe movement for a horizontal swipe is 85% linear for one stroke while for another stroke, the swipe movement may be determined to be 98% linear with respect to horizontal direction.

In some embodiments, the electronic device may have a stored list of values for one or more of these parameters which may be used as reference values for determining a mood of the user. A different set of values of parameters may be associated with each mood. For example, for a happy mood, the reference range values of duration of contact of a touch input may be 600-650 milliseconds, linearity of the touch input may be 80%-85%, and angle of touch may be 80°-90°. Similarly, for an angry mood, the reference range values of duration of contact of a touch input may be 400-450 milliseconds, linearity of touch input may be 90%-95% and the angle may be 50°-60°. Similarly, a list of reference values may be associated with each mood and stored in the electronic device at the time of manufacture or provided to the electronic device as an update.

In some embodiments, the processor may also dynamically learn additional values of the touch-sensitive parameters for different moods over a period of time. To improve the accuracy of the electronic device in determining the mood of the user, the user may provide one or more touch inputs so that the electronic device is able to store training data sets for different moods. A training data set may include touch-sensitive parameters that are specific to a mood of the user. In one example, when the user is in a "happy" mood, the user may enable a training mode in the electronic device and provide a touch input to the electronic device. The electronic device may determine touch-sensitive parameters associated with the provided touch input. These touch-sensitive parameters may be associated with the "happy" mood by the electronic device and stored in the electronic device for future reference. The electronic device may be trained for storing training data sets for different moods in a similar manner to further increase the accuracy of detecting the mood of the user.

Referring back to step 204, when the user provides the first input to the electronic device, the processor of the electronic device may determine values for one or more of the touch-sensitive parameters associated with the first input, as discussed. Further, the processor compares the determined values to the stored reference values to determine a mood of the user. For example, if the determined values of the parameters match closely to the stored reference values associated with "happy" mood, the mood of the user may be determined to be "happy."

Once the mood is determined, the processor may refer user preferences that are stored in the memory of the electronic device. The user preferences may include a mapping between various moods of the user and password themes that were configured by the user. An example of user preferences is illustrated in table 1. In an exemplary scenario, the processor may determine one or more touch-sensitive parameters from a swipe input by the user. Based on these determined touch-sensitive parameters and their stored reference values, the processor may determine that the mood of the user is "happy." Further, the processor may refer to the user preferences in table 1 and determine that the mood "happy" is mapped to password theme "music." Thus, based on the user preferences and the touch-sensitive parameters associated with the swipe input, the processor may determine the password theme "music."

In step 206, the processor displays the determined password theme that includes a plurality of visual cues on a display screen of the electronic device. In one example, the determined password theme may be displayed on a touch screen on which the user provides the first input. In another example, a user may provide the first input on a touch pad but the determined password theme may be displayed on a display screen.

In some embodiments, the plurality of visual cues included in the determined password theme may be grouped into different categories associated with the determined password theme. Each category may include a group of visual cues from the plurality of visual cues. In one example, a determined password theme may be "music" and may include six different categories associated with music—classical music, country music, pop music, electronic music, metal music, and blues music. Each of these categories may include multiple visual cues associated with that category. For example, the category "classical music" may include the visual cues—symphony, opera, choral works, chamber music, gregorian chant, madrigal, dhrupad, dhamar, and khayal that represent nine types of classical music. Similarly, the category "pop music" may include the visual cues—ambient, downtempo, electronic rock, eurodance, hard dance, house music, jungle, post-disco, and techno that represent different types of pop music. Other categories of this password theme may also include one or more visual cues in a similar manner. It should be apparent to a person skilled in the art that the number of visual cues in a category may not necessarily be equal to other categories and can be more or less than another category associated with the password theme.

Figure 3:
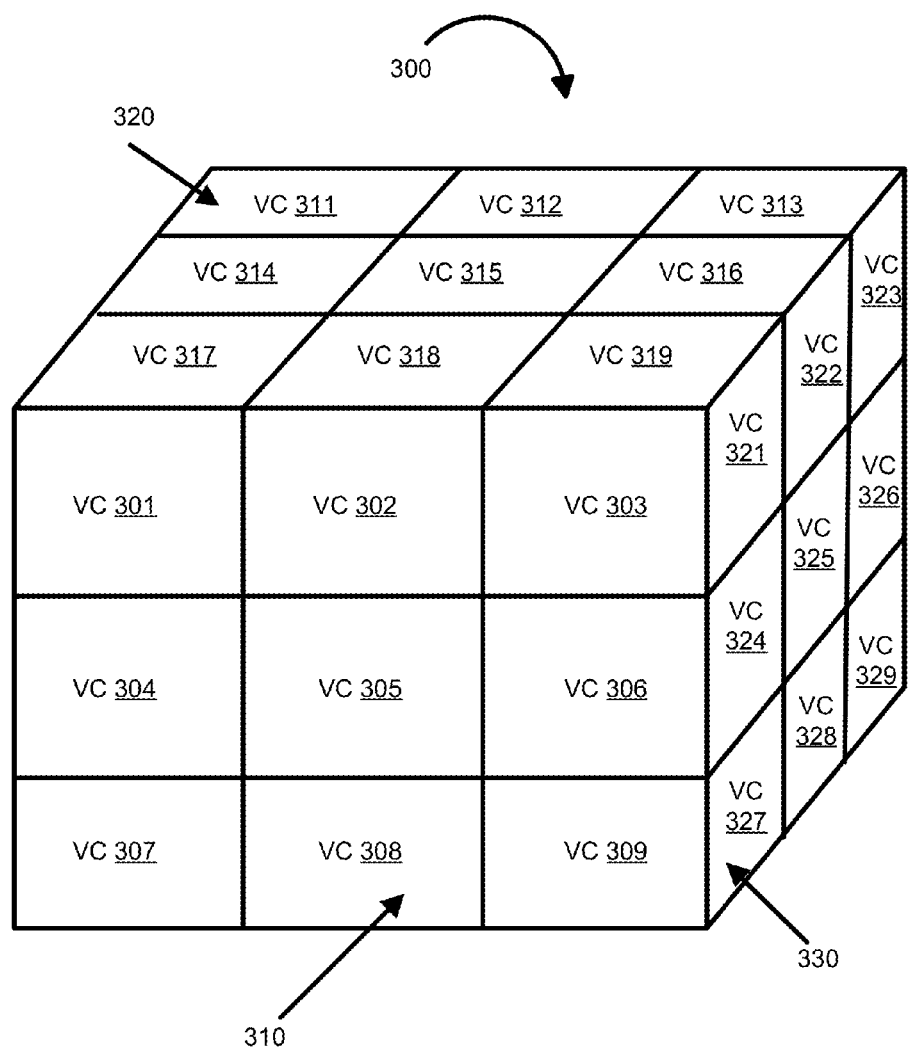
FIG. 3 illustrates an exemplary multidimensional object for displaying password themes in accordance with some embodiments.

In some embodiments, the predetermined theme may be displayed by the processor on a multidimensional object on a display screen of the electronic device. An exemplary three dimensional object in the form of a three dimensional cube is illustrated in FIG. 3. The determined password theme may be represented on cube 300. Cube 300 may include visual cues—VC 301, VC 302, VC 303, VC 304, VC 305, VC 306, VC 307, VC 308, and VC 309 displayed on face 310, visual cues—VC 311, VC 312, VC 313, VC 314, VC 315, VC 316, VC 317, VC 318, and VC 319 displayed on face 320, visual cues—VC 321, VC 322, VC 323, VC 324, VC 325, VC 326, VC 327, VC 328, and VC 329 displayed on face 330. It is understood that these faces are illustrated only for exemplary purposes and cube 300 includes a total of six faces. Further, it should be understood that the number of faces may change according to the type of multidimensional object that is displayed.

Each category of the determined password theme may be associated with a face of cube 300 and may be represented on that face. In some embodiments, face 310 may represent a first category of visual cues associated with the determined password theme—VC 301, VC 302, VC 303, VC 304, VC 305, VC 306, VC 307, VC 308, and VC 309. Face 320 may represent a second category of visual cues associated with the determined password theme—VC 311, VC 312, VC 313, VC 314, VC 315, VC 316, VC 317, VC 318, and VC 319. Similarly, face 330 may represent a third category of visual cues—VC 321, VC 322, VC 323, VC 324, VC 325, VC 326, VC 327, VC 328, and VC 329.

In an exemplary scenario, the three dimensional cube 300 may represent the determined password theme "music." Each of the categories of music such as classical music, country music, pop music, electronic music, metal music, and blues music may be displayed on a face associated with that category. Here, face 310 may represent the category "classical music", face 320 may represent the category "country music", face 330 may represent the category "pop music" and so on. In keeping with this example, the visual cues VC 301, VC 302, VC 303, VC 304, VC 305, VC 306, VC 307, VC 308, and VC 309 may represent types of classical music—symphony, opera, choral works, chamber music, gregorian chant, madrigal, dhrupad, dhamar, and khayal, respectively. Other faces of cube 300 may represent the categories and visual cues associated with those faces in a similar manner as discussed.

It should be apparent to a person skilled in the art that the number of visual cues associated with a face or a category may be more or less than the number of visual cues illustrated here. Further, it should be apparent to a person skilled in the art that all the faces may not necessarily be associated with a category. One or more faces may not represent anything in case the number of categories associated with the password theme is less than the number of faces of the multidimensional object.

Referring back to FIG. 2, the electronic device may receive a second input selecting a sequence of visual cues from the plurality of visual cues in step 208. In some embodiments, the second input may be a touch input received from the user of the electronic device. The user may select a sequence of visual cues from the displayed visual cues associated with the displayed password theme. Here, the user may select one or more visual cues from each of the displayed categories associated with the displayed password theme. In some embodiments, the user must select a minimum number of visual cues to enhance security. For example, a user must select a minimum of three visual cues from all the displayed visual cues associated with a displayed password theme for security purposes. It should be apparent to a person skilled in the art that it is not necessary to select visual cues from all the categories. A user may select visual cues from only some of the categories depending upon a password that the user associated with the displayed password theme while configuring the password theme.

In an exemplary scenario, a password theme "music" may be displayed on a three dimensional cube by displaying different categories associated with music on each face of the cube. Based on a predetermined password that was previously associated with the password theme "music" as its default password by the user, the user may select a combination of visual cues in a sequential order. The selection of visual cues may include selecting one or more visual cues from each of the categories that are displayed on the three dimensional cube. In keeping with this example, the user may select four visual cues from four different categories of music in a sequential order. Here, the user may select visual cues—opera, bluegrass, ambient, and heavy metal in the illustrated sequence, each from a different category associated with the password them "music." After selecting a visual cue from its associated face, the cube may be rotated by the user to display another face in order to select the next visual cue in the sequence. The user may do so until the entire sequence of visual cues is selected. The rotation of cube after each visual cue is selected may reduce the probability of the selection being visible to another user.

In step 210, the processor may verify the sequence of visual cues that were selected. In some embodiments, the verification may include comparing the sequence of the selected visual cues with a predetermined password that was associated with the displayed password theme while configuring the password theme. This may include comparing visual cues selected during the second input with visual cues associated with the predetermined password. The verification may further include comparing the sequence of selected visual cues with a sequence of the visual cues associated with the predetermined password. Here, the processor may compare the sequential order of selection of the selected visual cues with the sequential order of selection of the visual cues associated with the predetermined password. The details regarding the generation and storing of the predetermined password associated with a password theme have already been discussed in the context of FIG. 1.

In keeping with the previous example, a user may select the sequence of visual cues—opera, bluegrass, ambient, and heavy metal associated with the password theme "music" by providing the second input to the electronic device. This sequence may be compared with a predetermined password that has been associated with the password theme "music" as its default password. Further, the processor may compare the selected visual cues with the visual cues associated with the predetermined password to determine whether a match exists between both of them. In addition, the sequential order of the selected visual cues may be compared with the sequence of selection of visual cues associated with the predetermined password to determine whether a match exists between both the sequential orders.

In step 212, the processor may determine whether the verification is successful or not. This may include determining whether the selected visual cues match with the visual cues associated with the predetermined password. This may further include determining whether the sequential order of the selected visual cues matches with the sequential order of visual cues associated with the predetermined password. A successful verification may indicate that all selected visual cues match with the visual cues associated with the predetermined password and the sequential order of the selected visual cues matches with the sequential order of selection of visual cues associated with the predetermined password.

In step 214, the processor may provide user access to the electronic device if the verification is successful. In some embodiments, this may include authenticating a user to access the electronic device if the verification is successful. For example, if the verification is successful, the processor may unlock the electronic device so that the user can access it. A user may be authenticated to access the electronic device if the sequence of the selected visual cues matches the combination of visual cues associated with the predetermined password and the sequence of the selected visual cues matches the sequence of visual cues associated with the predetermined password.

But if the verification is unsuccessful, for example, the sequence of the selected visual cues does not match with the combination and sequence of visual cues of the predetermined password, the electronic device may prompt the user to re-enter the second input to verify it again. The details regarding receiving the second input have already been discussed in the context of step 208 of FIG. 2. In some embodiments, the electronic device may do so for a fixed number of times until the verification is successful. If the number of attempts exceeds this fixed number of times and the verification is still unsuccessful, the electronic device may block the user from providing the second input temporarily.

In some embodiments of this disclosure, the electronic device may monitor one or more of location, time, date, and/or day along with the mood of the user every time the user provides the first input to the electronic device. In some embodiments, a combination of some or all of location, time, date, day, and mood of the user may be determined over a period of time. Further, a set of relevant visual cues may be dynamically determined as a password theme based on the determined combination. This set may differ from a password theme that is already associated with the mood of the user. For example, the electronic device may monitor over a period of two weeks that the user visits a restaurant at all weekdays during lunch time. Further, the electronic device may determine that the user is in a "happy" mood during a substantial portion of these two weeks. The electronic device, in this case, may determine from the internet, a set of visual cues that represent different food items available in the restaurant. Further, since the user may already have another password theme "music" associated with the "happy" mood, the electronic device may prompt the user whether to keep the existing password theme "music" or select the suggested set of food items as a new password theme for the determined combination of mood, location, day, and/or time. In case the user selects the suggested set of visual cues as a new password theme, the new password theme may be displayed if in the future, the user attempts to unlock the electronic device in the restaurant during lunch time on a weekday.

In some embodiments, the electronic device may allow a user to change a password theme associated with a mood. For example, the processor of the electronic device may determine that the time taken to provide the second input has considerably reduced over a period of time. Here, the processor may determine that the user may be selecting all the visual cues associated with the password theme "music" in a very short duration as compared to the time taken when the theme was newly configured. A possible reason for this may be that the user has gotten bored of using the password theme "music" over a period of time. Therefore, the electronic device may suggest one or more new password themes to the user to associate with the mood "happy" to which the password theme "music" was previously associated. Here, the electronic device may suggest a list of themes such as "shopping activities", "cars," or "restaurants" to the user. On selecting a theme, a user may configure the theme further and associate it with the mood "happy" for future use. Alternately in some embodiments, a user may also manually change a password theme associated with a mood by changing the user preferences and store the updated user preferences in the memory of the electronic device.

Figure 4:
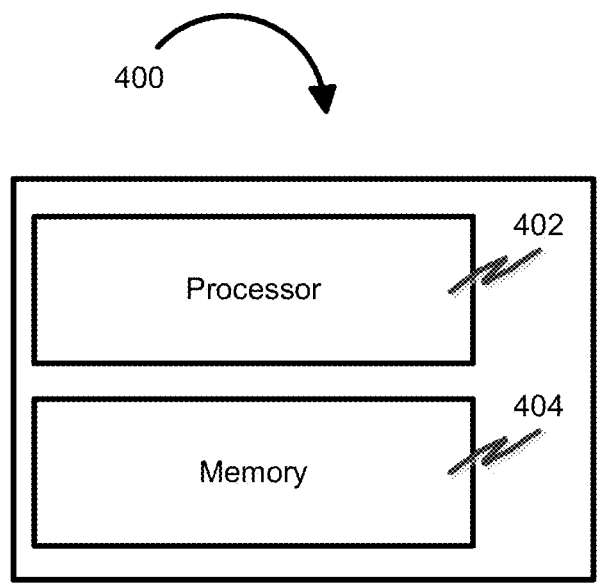
FIG. 4 illustrates a block diagram of an electronic device in accordance with some embodiments.

FIG. 4 illustrates a block diagram of an electronic device 400 in accordance with some embodiments. The electronic device may include a processor 402 and a memory 404. In some embodiments, electronic device 400 may include a mobile device, a touch screen device, a tablet, a personal digital assistant, a laptop, a touch pad, or a desktop workstation. It should be noted, however, that the electronic device is not limited to these devices and may include any computing device on which touch functionality may be implemented either as an internal functionality or by connecting external peripherals to the electronic device.

Electronic device 300 may be programmed by a user to configure one or more password themes and set user preferences associated one or more of the configured password themes. Further, a user may generate a password associated with each of the configured password themes and store it in memory 404 as described in the context of FIG. 1.

In some embodiments, electronic device 400 may receive a first input from a user for requesting authentication of the user. On receiving the first input, processor 402 may determine one or more touch-sensitive parameters associated with the first input. Here, the first input may include a touch stroke, for example. Further, the touch-sensitive parameters may include, but are not limited to angle of a stroke, duration of a stroke, pressure applied by a stroke, direction of a stroke, shape of a movement associated with a stroke, position coordinates associated with a stroke, length of a stroke, humidity associated with a stroke, temperature associated with a stroke, speed of a stroke, acceleration of a stroke, and irregularity associated with a stroke. Further, processor 402 may determine a mood of the user based on the determined touch-sensitive parameters. Once the mood is determined, processor 402 may determine a password theme associated with the mood based on user preferences. Some example user preferences are illustrated in table 1.

On determining a password theme associated with the mood of the user, processor 402 may display the determined password theme on a display screen (not shown) of electronic device 400. The displayed password theme may include a plurality of visual cues associated with the displayed password theme. The visual cues may be grouped into one or more categories associated with the displayed password theme. Each category may, thus, include one or more visual cues. In some embodiments, the password theme may be displayed on a multidimensional object. Further, each of the categories associated with the password theme may be displayed on an associated face of the multidimensional object.

Further, a user may provide a second input to electronic device 400 by selecting a sequence of visual cues from the plurality of visual cues associated with the displayed password theme. In some embodiments, a user may select one or more visual cues from one or more of the categories associated with the displayed theme.

Once electronic device 400 receives the second input, processor 402 may verify the sequence of visual cues that were selected. In some embodiments, the verification may include comparing the sequence of the selected visual cues with a predetermined password associated with the displayed password theme. This may include comparing all selected visual cues with the visual cues associated with the predetermined password. The verification may further include comparing the sequence of selected visual cues with a predetermined sequence of visual cues associated with the predetermined password.

Further, processor 402 may determine whether the verification is successful or not. This may include determining whether the selected visual cues match the visual cues associated with the predetermined password. This verification may further include determining whether the sequential order of the selected visual cues matches the sequential order of visual cues associated with the predetermined password. A successful verification may indicate that all selected visual cues match with the visual cues associated with the predetermined password and the sequential order of the selected visual cues matches the sequential order of selection of visual cues associated with the predetermined password.

If the verification is successful, processor 402 may provide user access to electronic device 400. In some embodiments, this may include authenticating a user to access electronic device 400 if the verification is successful. But if the verification is unsuccessful, for example, the sequence of the selected visual cues does not match with the combination and sequence of visual cues of the predetermined password, electronic device 400 may prompt the user to re-enter the second input to verify it again. In some embodiments, electronic device 400 may do so for a fixed number of times until the verification is successful. If the number of attempts exceeds this fixed number of times and the verification is still unsuccessful, electronic device 400 may block the user from providing the second input for a fixed duration of time.

The specification has described authentication of an electronic device based on user preferences. It is convenient for a user of the electronic device to remember the passwords associated with various password themes because the visual cues in each password may represent a combination of favorite items or activities of the user. Further, the methods and systems in the disclosure enhance the security of authentication by adding a further security layer of dynamically displaying password themes based on various moods of the user. A password theme is dynamically displayed based on a mood of a first user of the electronic device, which is further dependent on a combination of touch-sensitive parameters specific to the first user. Thus, even if a password for one password theme is seen or hacked by a second user, there is very less probability that the same password theme would be displayed to the second user based on a touch input received by the second user. This is because the combination of determined touch-sensitive parameters may be entirely different for the second user than the first user which may result in a different password theme being displayed whose password is not known to the second user.

Figure 5:
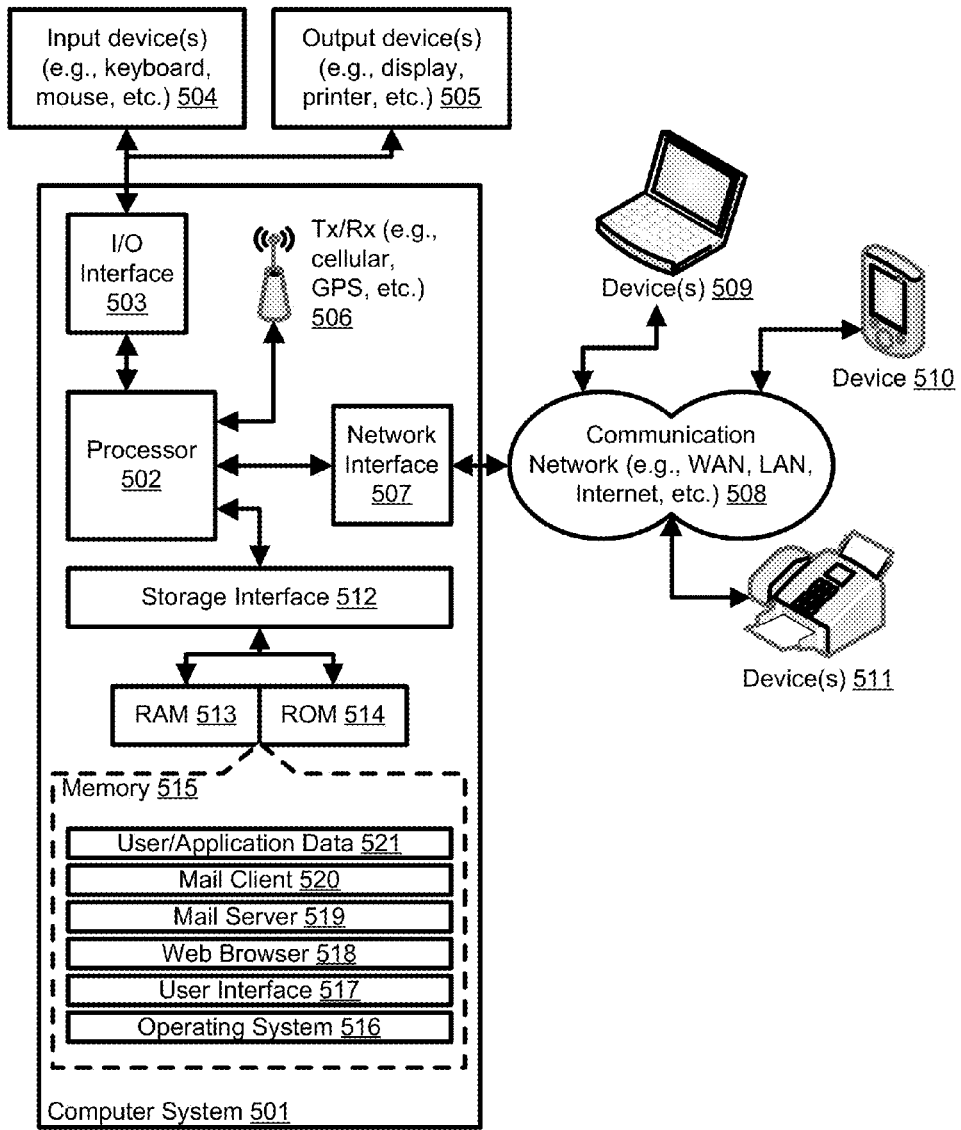
FIG. 5 is a block diagram of an exemplary computer system for implementing embodiments consistent with the present disclosure.

FIG. 5 is a block diagram of an exemplary computer system for implementing embodiments consistent with the present disclosure. Variations of computer system 501 may be used for implementing any of the devices presented in this disclosure. Computer system 501 may comprise a central processing unit ("CPU" or "processor") 502. Processor 502 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM47501UB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 510, 511, and 512. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. An authentication method for an electronic device, comprising:
   receiving, at the electronic device, a first input;
   determining a password theme based on the first input and user preferences associated with the password theme, wherein determining the password theme based on the first input and user preferences associated with the password theme comprises:
   determining the password theme based on a stored mapping table comprising a mapping between a plurality of password themes and a plurality of moods of a user associated with one or more of the plurality of password themes;
   displaying the password theme, the displayed password theme comprising a plurality of visual cues;
   receiving, at the electronic device, a second input comprising a sequence of visual cues selected from the visual cues;
   verifying the sequence of visual cues; and
   providing access to the electronic device based on the verification,
   wherein determining the password theme based on the first input and user preferences associated with the password theme further comprises: receiving input from a user at a touch screen device; and
   identifying a current mood of the user based on at least one of a duration of a stroke on the touch screen device, an angle of a stroke on the touch screen device, and a pressure applied to the touch screen device during a stroke, wherein the password theme is based on the current mood.

2. The method of claim 1, wherein displaying the password theme comprises
   grouping each of the plurality of visual cues according to a plurality of categories associated with the password theme; and
   displaying the plurality of visual cues based on the grouping.

3. The method of claim 2, wherein displaying the plurality of visual cues comprises displaying the visual cues on a rendered three-dimensional object having a plurality of faces, wherein each face of the plurality of faces is determined based on its grouping.

4. The method of claim 1, wherein verifying the sequence of visual cues comprises:
   comparing the sequence of visual cues with a predetermined combination of visual cues; and
   comparing the sequence of visual cues with a predetermined sequence of visual cues.

5. The method of claim 4, wherein providing access based on the verification comprises authenticating a user based on a match between the sequence of visual cues and the predetermined combination of visual cues and a match between the sequence of visual cues and the predetermined sequence of visual cues.

6. The method of claim 1, wherein the first input comprises a touch-sensitive parameter, and wherein determining the password theme comprises determining the password theme based on the touch-sensitive parameter.

7. The method of claim 6, wherein the touch-sensitive parameter comprises at least one of a stroke length, a stroke direction, a stroke pressure, a stroke speed, and/or a stroke acceleration.

8. An electronic device comprising:
   at least one processor; and
   a memory storing instructions executable by the at least one processor, wherein
   the instructions configure the at least one processor to:
   receive a first input; determine a password theme based on the first input and user preferences associated with the password theme wherein, to determine the password theme, the instructions configure the at least one processor to:
   determine the password theme based on a stored mapping table comprising a mapping between a plurality of password themes and a plurality of moods of a user associated with one or more of the plurality of password themes;
   display the password theme, the displayed password theme comprising a plurality of visual cues; receive a second input comprising a sequence of visual cues selected from the visual cues; verify the sequence of visual cues; and
   provide access to the electronic device based on the verification,
   wherein to determine the password theme the instructions further configure the at least one hardware processor to: receive input from a user at a touch screen device; identify a current mood of the user based on at least one of a duration of a stroke on the touch screen device, an angle of a stroke on the touch screen device, and a pressure applied to the touch screen device during a stroke, wherein the password theme is based on the current mood.

9. The device of claim 8, wherein the displayed password theme comprises a grouping of each of the visual cues according to a plurality of categories associated with the password theme.

10. The device of claim 9, wherein the visual cues are displayed on a rendered three-dimensional object having a plurality of faces, wherein each face of the plurality of faces is determined based on its grouping.

11. The device of claim 8, wherein the instructions further configure the at least one hardware processor to:
    verify the sequence of visual cues by comparing the sequence of visual cues with a predetermined combination of visual cues; and
    comparing the sequence of visual cues with a predetermined sequence of visual cues.

12. The device of claim 11, wherein the instructions further configure the at least one hardware processor to:

provide access to the electronic device by authenticating a user based on a match between the sequence of visual cues and the predetermined combination of visual cues and a match between the sequence of visual cues and the predetermined sequence of visual cues.

13. A non-transitory computer-readable medium storing instructions that, when executed by one or more processors, causes the processor to perform operations comprising:
receiving, at an electronic device, a first input from a user;
determining a password theme based on the first input and user preferences associated with the password theme;
displaying the password theme, the displayed password theme comprising a plurality of visual cues, wherein displaying the password theme comprises determining the password theme based on a stored mapping table comprising a mapping between a plurality of password themes and a plurality of moods of a user associated with one or more of the plurality of password themes;
receiving, at the electronic device, a second input comprising a sequence of visual cues selected from the plurality of visual cues;
verifying the sequence of visual cues; and
providing access to the electronic device based on the verification,
wherein displaying the password theme further comprises:
receiving input from a user at a touch screen device;
identifying a current mood of the user based on at least one of a duration of a stroke on the touch screen device, an angle of a stroke on the touch screen device, and a pressure applied to the touch screen device during a stroke, wherein the password theme is based on the current mood.

14. The medium of claim 13, wherein displaying the theme comprises grouping each of the plurality of visual cues according to a plurality of categories associated with the password theme, and
displaying the plurality of visual cues based on the grouping.

15. The medium of claim 14, wherein displaying the plurality of visual cues comprises displaying the visual cues on a rendered three-dimensional object having a plurality of faces, wherein each face of the plurality of faces is determined based on its grouping.

16. The medium of claim 13, wherein verifying the sequence of visual cues comprises:
comparing the sequence of visual cues with a predetermined combination of visual cues; and
comparing the sequence of visual cues with a predetermined sequence of visual cues.

17. The medium of claim 16, wherein providing access based on the verification comprises authenticating a user based on a match between the sequence of visual cues and the predetermined combination of visual cues and a match between the sequence of visual cues and the predetermined sequence of visual cues.

* * * * *